United States Patent [19]

Dang et al.

[11] Patent Number: 5,680,377
[45] Date of Patent: Oct. 21, 1997

[54] AUTOMATED DATA STORAGE LIBRARY EMPLOYING MULTI-DIRECTION PICKER WITH DOUBLE LIP GRIPPER

[75] Inventors: Chi Hung Dang; Chi Thanh Dang, both of Tucson, Ariz.

[73] Assignee: International Business Machines Corporation, Armonk, N.Y.

[21] Appl. No.: 455,575

[22] Filed: May 31, 1995

Related U.S. Application Data

[62] Division of Ser. No. 147,228, Nov. 3, 1993.

[51] Int. Cl.$^6$ ................................................. G11B 15/68
[52] U.S. Cl. .......................... 369/36; 360/98.04; 369/192
[58] Field of Search ........................... 360/92, 98.04; 369/36, 178, 191–192, 34; 414/751, 758, 761–763

[56] References Cited

U.S. PATENT DOCUMENTS

| | | | |
|---|---|---|---|
| 3,880,294 | 4/1975 | Arseneault | 214/18 |
| 3,956,768 | 5/1976 | Covington | 360/92 |
| 4,173,427 | 11/1979 | Beuch et al. | 414/751 |
| 4,226,570 | 10/1980 | Holecek et al. | 414/751 |
| 4,462,742 | 7/1984 | Hradel | 414/280 |
| 4,675,856 | 6/1987 | Rudy et al. | 369/36 |
| 4,815,055 | 3/1989 | Fago, Jr. | 369/36 |
| 4,817,070 | 3/1989 | Hug et al. | 369/36 |
| 4,846,619 | 7/1989 | Crabtree et al. | 414/273 |
| 4,910,619 | 3/1990 | Suzuki et al. | 360/92 |
| 4,984,108 | 1/1991 | Grant et al. | 360/92 |
| 5,144,506 | 9/1992 | Sahota | 360/92 |
| 5,293,284 | 3/1994 | Sato et al. | 360/92 |
| 5,363,258 | 11/1994 | Coles et al. | 360/92 |
| 5,416,653 | 5/1995 | Marlowe | 360/92 |

FOREIGN PATENT DOCUMENTS

| | | |
|---|---|---|
| 57-135477 | 8/1982 | Japan. |
| 1-178160 | 7/1989 | Japan. |
| 2-94158 | 4/1990 | Japan. |
| 2-302958 | 12/1990 | Japan. |
| 4-157659 | 5/1992 | Japan. |

*Primary Examiner*—Stuart S. Levy
*Assistant Examiner*—Brian E. Miller
*Attorney, Agent, or Firm*—Baker, Maxham, Jester & Meador

[57] ABSTRACT

An automated data storage library of unique design includes a plurality of storage cell magazines containing storage cells for holding storage media cartridges therein. A picker mechanism having multiple direction capability is positioned for accessing and transporting the storage media cartridges between at least three adjacent storage cell magazines. The picker mechanism includes a pair of gripper pickers configured for releasably gripping and supporting the storage media cartridges during transport between the storage cells. The picker mechanism is rotatable so that one of the grippers can be utilized to access two of the adjacent storage cell magazines while the second gripper accesses the third storage cell magazine. For increased efficiency, the picker mechanism can be positioned between opposing columns of storage cell magazines together with a single storage cell column at one end. Plural picker mechanisms can also be positioned between adjacent sets of storage cell magazines having three adjacent storage cell magazines each. Still further, the picker mechanism could be positioned to access a peripheral storage device in communication with a host processor, together with a pair of rotatable cartridge carousels containing plural storage cell magazines.

14 Claims, 8 Drawing Sheets

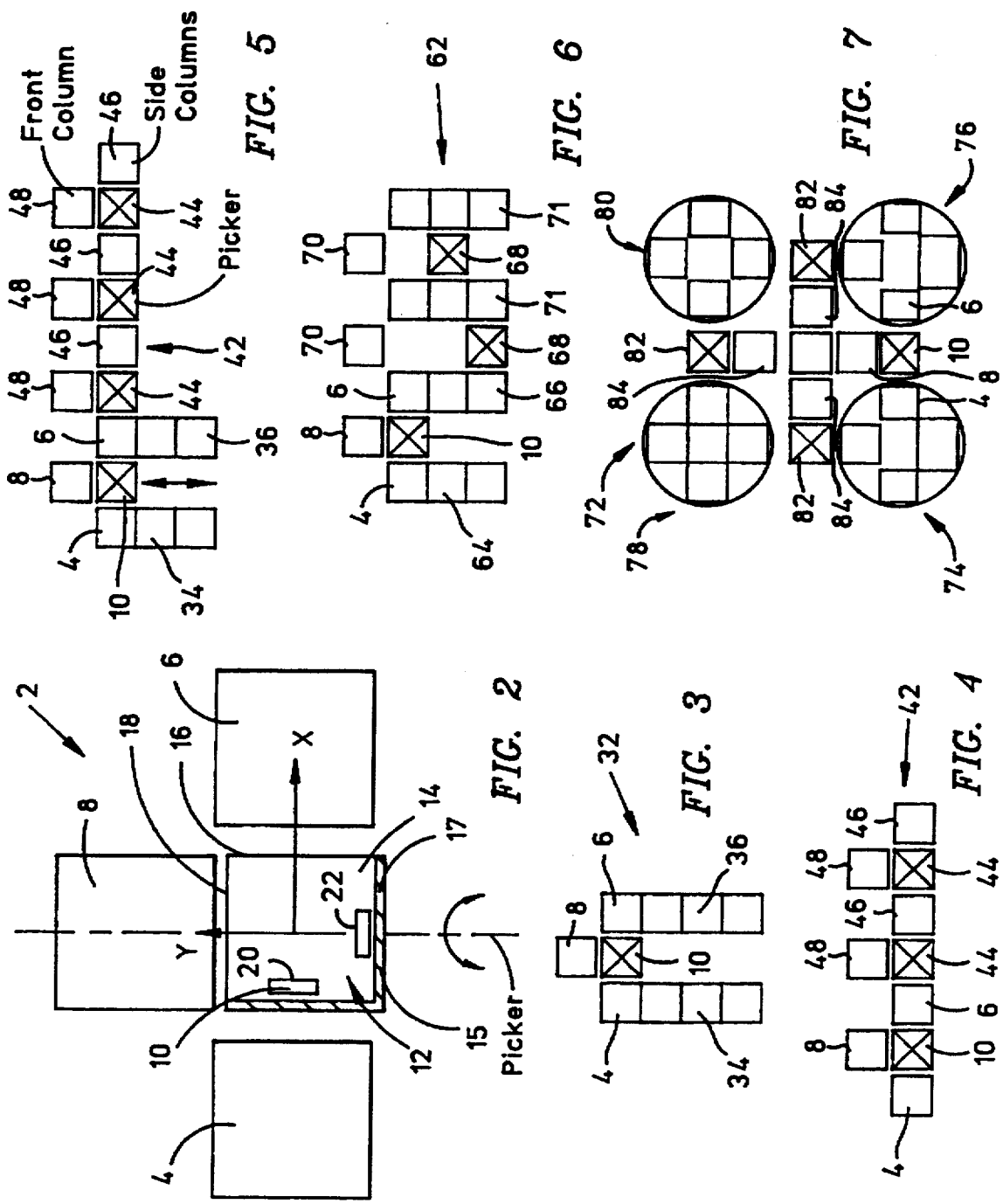

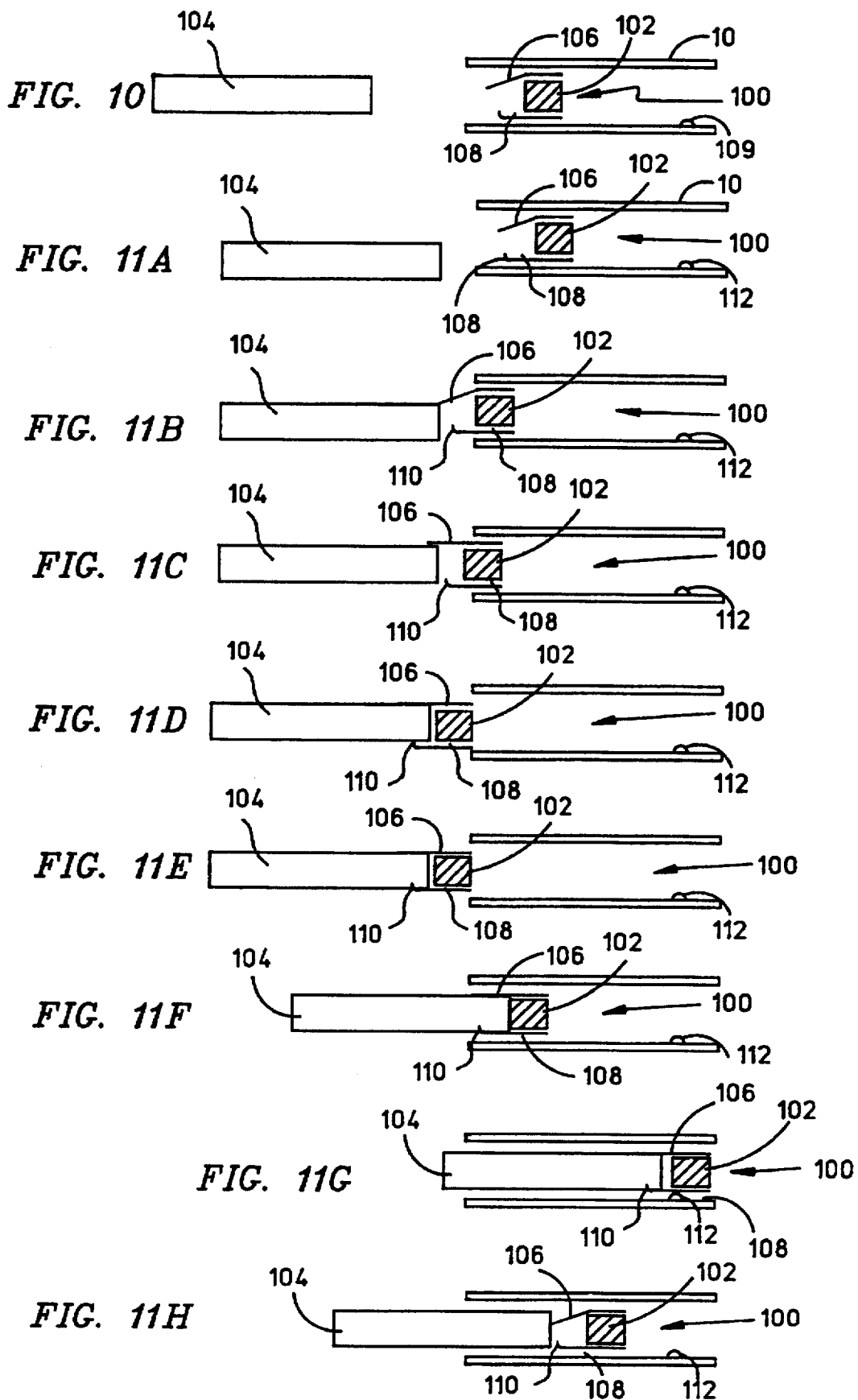

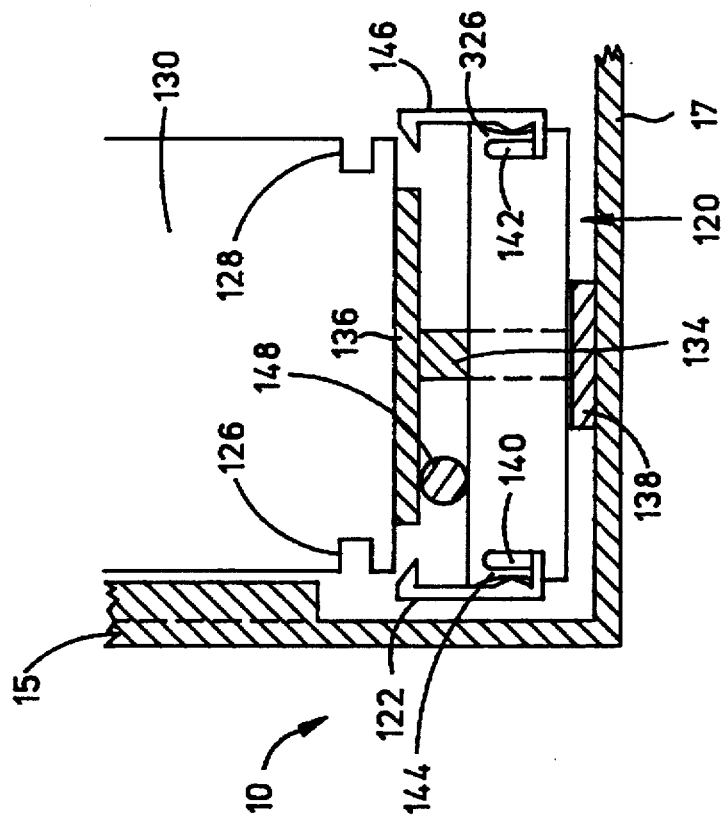
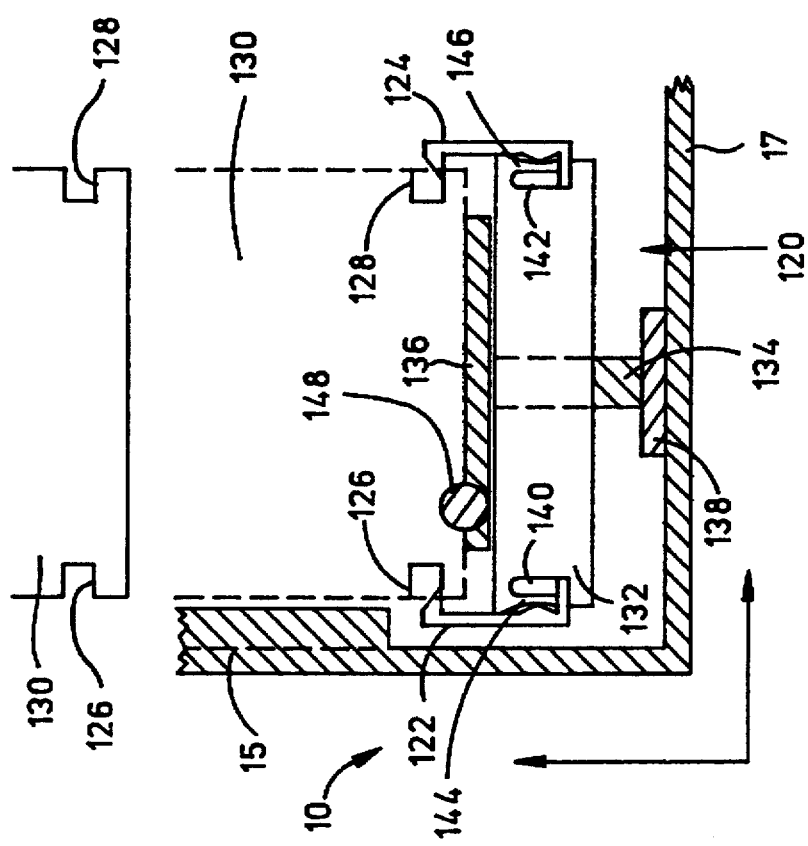
FIG. 12
FIG. 13

AUTOMATED DATA STORAGE LIBRARY EMPLOYING MULTI-DIRECTION PICKER WITH DOUBLE LIP GRIPPER

CROSS-REFERENCE TO RELATED APPLICATION

This application is a division of pending application Ser. No. 08/147,228 filed Nov. 3, 1993.

BACKGROUND OF THE INVENTION

The present invention relates to automated data storage libraries for storing and retrieving cartridges with data storage media therein, for use by data processing apparatus having access to such libraries.

Automated data storage libraries provide a data storage environment in which large quantities of data are distributed between a plurality, of discrete data storage elements, such as magnetic tape or optical disk cartridges, which are placed in addressable storage cell locations arranged in one or more storage cell banks. The storage elements are accessed using positionable cartridge picker mechanisms which may include one or more selectively activatable cartridge grippers.

In order to transport a data storage element between storage cell locations, one of which may contain a data read/write unit in communication with a host data processing system, a picker mechanism is first positioned at a source storage cell containing a data storage element to be retrieved. A gripper is activated to engage the storage element and retract it from the storage cell. The picker mechanism is then positioned at a destination cell and the gripper is again activated to insert the storage element in the storage cell and release it.

Data storage libraries have been proposed in which single direction pickers are used to access columns of cartridge magazines from a single side. The storage cartridges are picked at one end that is opposite to the cartridge opening or shuttle door. This picker arrangement has the capability to reach only one cartridge at a time from one fixed position. Applicant has proposed a data storage library using a pass through picker that can reach multiple cartridges on opposing sides of the picker (180 degree picking) without changing its position, which opens the possibility of extendable library architectures involving a combination of dual-opening storage cells and duet cell pickers.

It is submitted that further advantage could be derived from a data storage library that is extendable by its capability to provide 180 degree picking, yet which also has the ability to function as an end picker in order to serve additional storage cells without having to be repositioned. Adding repositioning capability to this arrangement would permit access to still more storage cell configurations. What is required is a system of reduced complexity and cost in which configuration flexibility is maximized and data storage and retrieval times are effectively minimized.

SUMMARY OF THE INVENTION

In accordance with the foregoing objectives, an automated data storage library of unique design is provided. The data storage library includes a plurality of storage cell magazines containing storage cells for holding storage media cartridges therein. A picker mechanism having multiple direction capability is positioned for accessing and transporting the storage media cartridges between at least three adjacent storage cell magazines. The picker mechanism includes a pair of gripper pickers configured for releasably gripping and supporting the storage media cartridges during transport between the storage cells. The picker mechanism is rotatable so that one of the grippers can be utilized to access two of the adjacent storage cell magazines while the second gripper accesses the third storage cell magazine. For increased efficiency, the picker mechanism can be positioned between opposing columns of storage cell magazines together with a single storage cell column at one end. Plural picker mechanisms can also be positioned between adjacent sets of storage cell magazines having three adjacent storage cell magazines each. Still farther, the picker mechanism could be positioned to access a peripheral storage device in communication with a host processor, together with a pair of rotatable cartridge carousels containing plural storage cell magazines.

BRIEF DESCRIPTION OF THE DRAWINGS

The objects, features and advantages of the invention will be more easily understood when considered in light of the following detailed description, together with the accompanying drawing figures, in which:

FIG. 2 is a plan view of a picker mechanism with multiple direction capability constructed in accordance with the present invention;

FIG. 3 is a plan view of a data storage library utilizing the picker mechanism of FIG. 2;

FIG. 4 is a plan view of an alternative data storage library utilizing the picker mechanism of FIG. 2;

FIG. 5 is a plan view of an alternative data storage library utilizing the picker mechanism of FIG. 2;

FIG. 6 is a plan view of an alternative data storage library utilizing the picker mechanism of FIG. 2;

FIG. 7 is a plan view of an alternative data storage library utilizing the picker mechanism of FIG. 2;

FIG. 10 is a plan view of a another gripper for use in the picker mechanism of FIG. 2;

FIGS. 11A, 11B, 11C, 11D, 11E, 11F, 11G and 11H illustrate the operation of the gripper of FIG. 10;

FIG. 12 is a plan view of another gripper for use in the picker mechanism of FIG. 2;

FIG. 13 is another plan view of the gripper of FIG. 12;

DETAILED DESCRIPTION OF THE PREFERRED EMBODIMENTS

Figure 1:
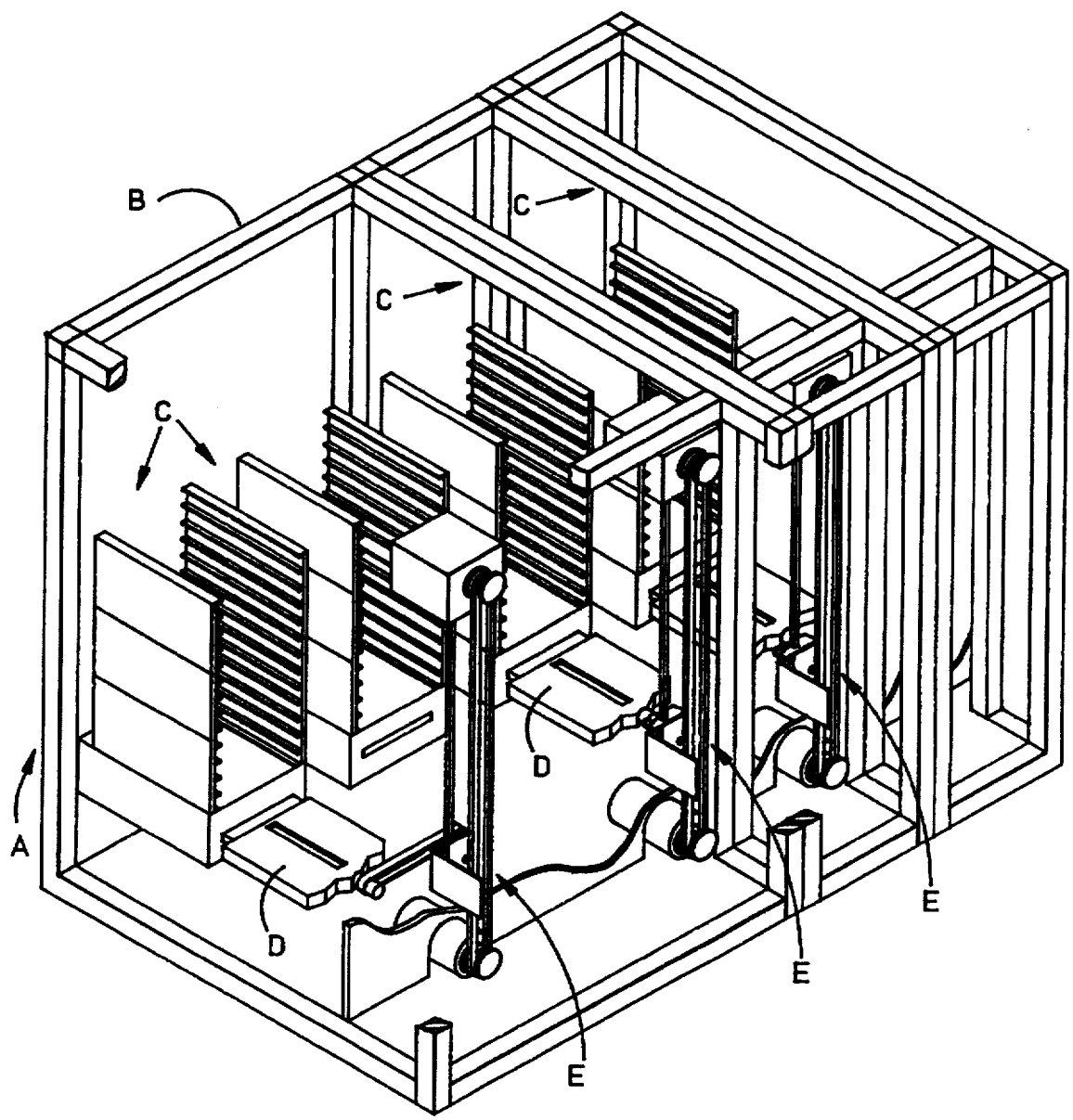
FIG. 1 is a perspective view of an automated data storage library.

Referring now to FIG. 1, a data storage library A illustrates a general configuration and construction which may be used to implement preferred embodiments of the present invention. The data storage library A includes a frame or housing B that supports a plurality of storage cell magazines C. The storage cell magazines C are formed as vertical columns of storage cells configured to hold storage media cartridges (containing, e.g., optical or magnetic disks) therein. The storage cell magazines C preferably include a peripheral read/write storage device (e.g., an optical disk drive) positioned below the storage cells. The peripheral storage devices are connected for communication with one or more host data processing systems (not shown). The storage cell magazines C are accessed by picker mechanism D that are mounted on vertical drive mechanisms E. The picker mechanisms are vertically positionable and controllable to selectively retrieve and transport storage media cartridges between storage cells.

The data storage library A could be the size of a personal computer or could be much larger depending on user requirements. Moreover, the data storage library A could be modular in nature so that plural data storage libraries could be physically combined for sharing storage media cartridges therebetween. The storage media cartridges could be of any conventional type including magnetic tape cassettes for serial access archive purposes and optical disk cartridges for more direct access storage applications. It will also be understood that the data storage library A could be used with a variety of data processing host devices including standalone and networked personal computers, work stations, mid-range computer systems and main frame systems.

Referring now to FIG. 2, a data storage library 2 constructed in accordance with the present invention is adapted for mounting in a storage library frame or housing such as the frame or housing B of FIG. 1. The data storage library 2 includes plural storage cell magazines 4, 6 and 8 formed as vertical columns of storage cells stacked in the "z" axis direction of FIG. 2. The storage cells of each storage cell magazine are configured for retaining storage media cartridges therein. At lease one of the storage cell magazines, designated for example by reference number 8 in FIG. 2, preferably possesses high performance capability or holds one or more peripheral storage devices in communication with one or more host data processing systems. The peripheral storage devices would thus be conveniently positioned for receiving storage media cartridges from other storage cell locations and for readily accessing the data therein. The storage media cartridges could be of any conventional type including magnetic tape cassettes and optical disk cartridges.)

The storage cell magazines 4, 6 and 8 are arranged for operation with a cartridge picker mechanism 10 positioned for accessing the storage cells of the storage cell magazines and for transporting storage media cartridges therebetween. The cartridge picker mechanism 10 includes a gripper system 12 for retrieving storage cartridges located in any of the three storage magazines 4, 6 and 8, which are positioned on three sides of the picker mechanism along discrete directional axes that are illustrated in FIG. 2 as the "x" and "y" axes. The cartridge picker mechanism 10 is mounted for rotation about the "y" directional axis so that the gripper system is positionable to access each of the storage cell magazines. The "x" and "y" directional axes are mutually perpendicular. These directional axes may also be thought of as first and second directional axes, with the storage cell magazines 4 and 6 representing two first-axis storage cell magazines positioned on the first directional axis and the storage cell magazine 8 representing a second-axis storage cell magazine positioned on the second directional axis.

Figure 13A:
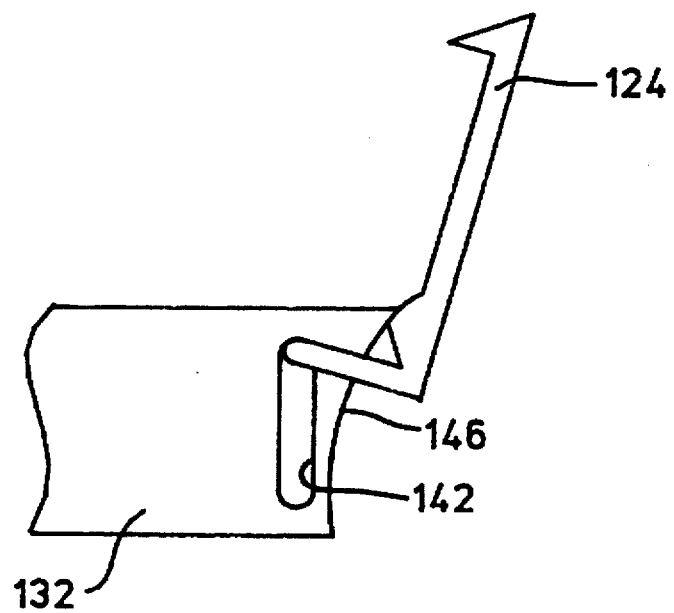
FIG. 13a is an enlarged detail view of the gripper arm in a cammed open position just prior to the position of the gripper arm shown in FIG. 13.
Figure 14:
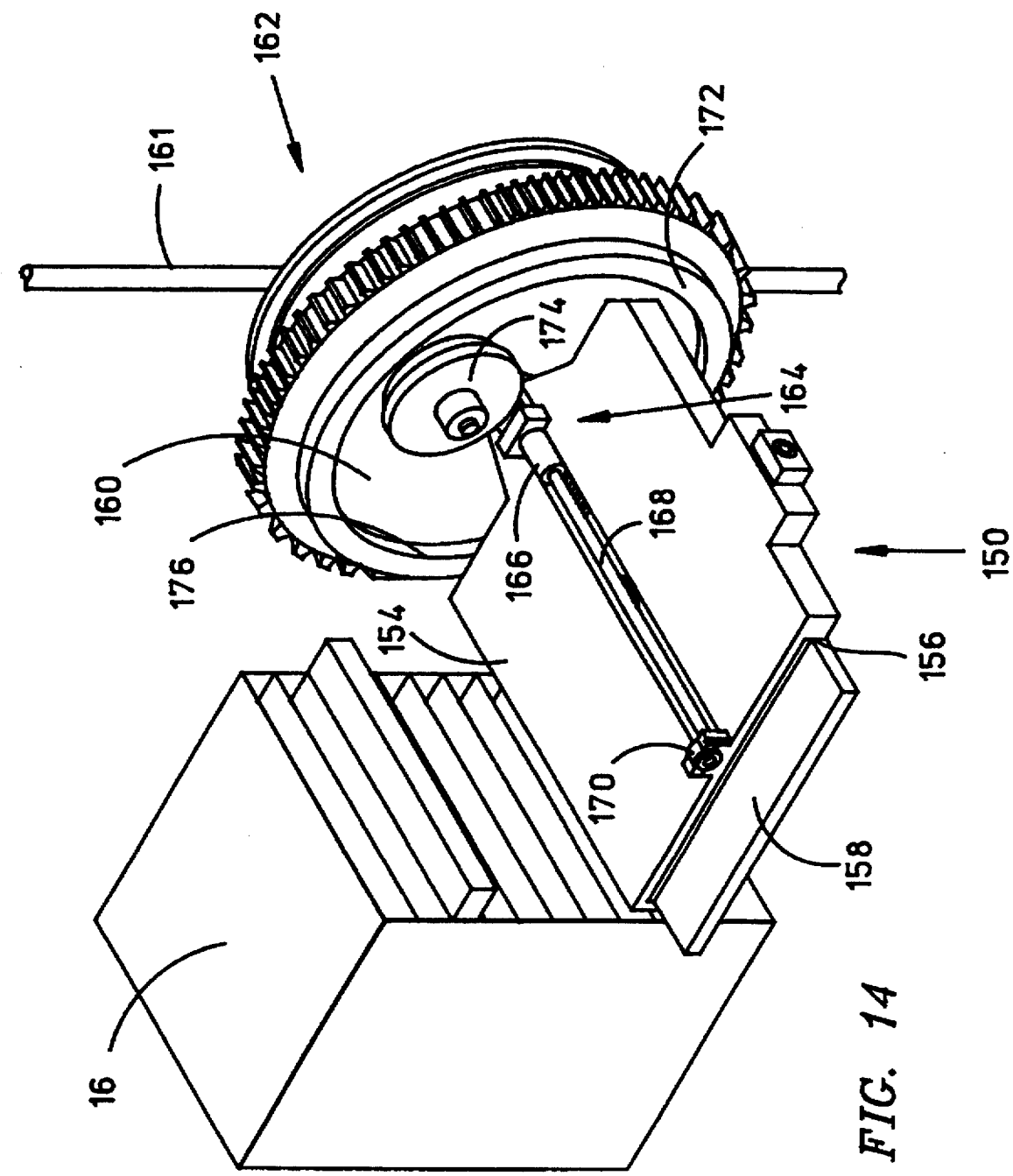
FIG. 14 is a perspective view of a picker mechanism for use in the data storage library of FIG. 2, showing a first side thereof.
Figure 15:
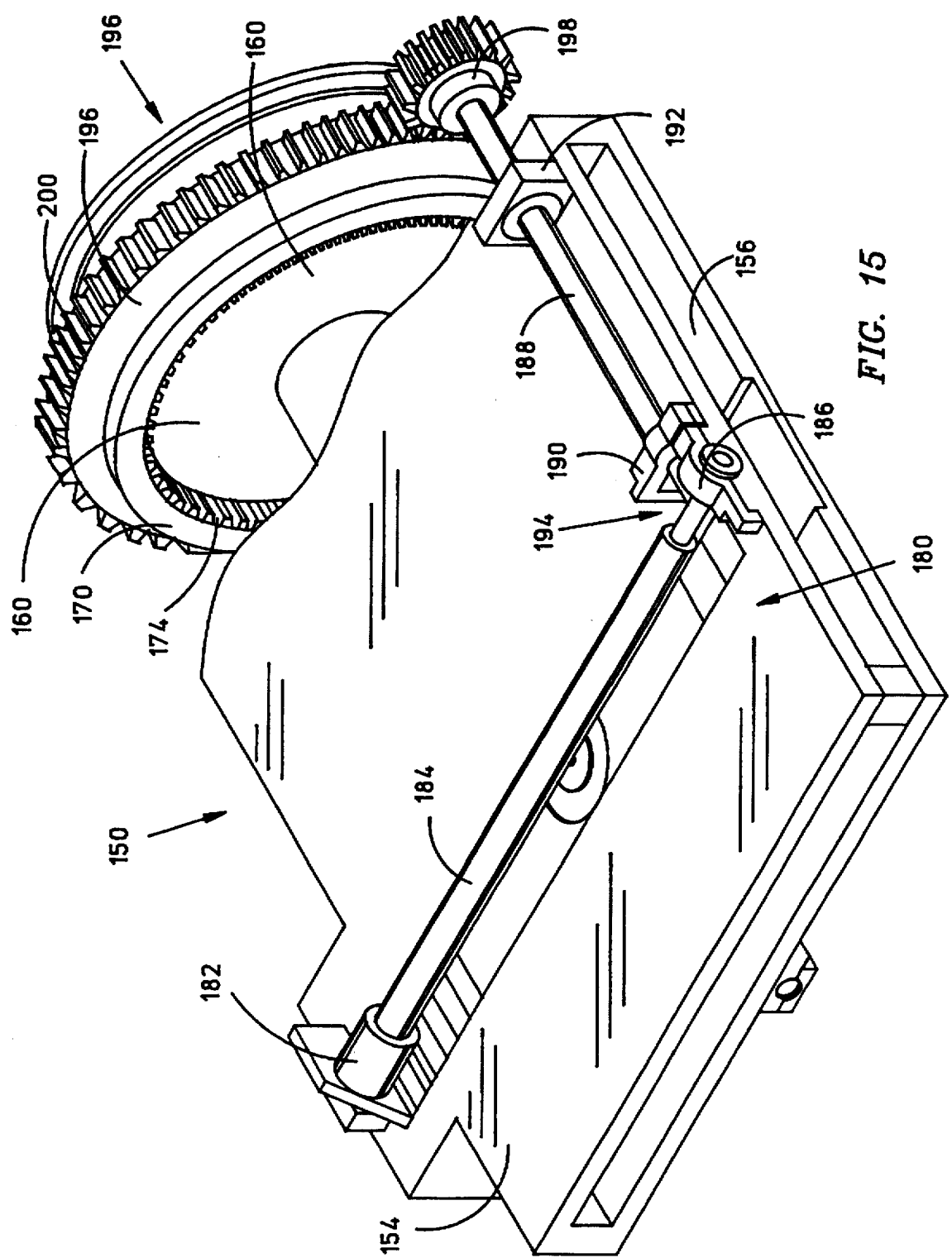
FIG. 15 is a perspective view of the picker mechanism of FIG. 14, showing a second side thereof.

The cartridge picker mechanism 10 includes a single cartridge chamber 14 having first and second closed sides 15 and 17, and opposing first and second open sides 16 and 18. The first open side 16 faces one of the first-axis storage cell magazines 4 or 6 (depending on the picker mechanism's rotational position), and the second open side 18 faces the second-axis storage cell magazine 8. The cartridge picker mechanism gripper system 12 includes first and second grippers 20 and 22 that are independently positionable toward the first and second open sides 16 and 18, respectively, in order to retrieve storage cartridges located in the storage cell magazines adjacent the first and second open sides. Typically, storage media cartridges will be stored in the data storage library 2 so that a media access end portion of each cartridge is oriented toward the positive direction of the "y" axis of FIG. 2. This orientation allows cartridges to be inserted in one or more peripheral data storage devices which, as indicated, may be positioned in the storage cell magazine 8. As a result of this cartridge orientation, the gripper 20 is preferably configured to grasp a side portion of the storage media cartridges to be retrieved, whereas the gripper 22 is configured to grasp an end portion of the storage media cartridges that is opposite the media access end portion thereof. In a preferred embodiment of the invention, the first gripper 20 is constructed in a manner shown in FIGS. 8 and 9, or alternatively, in FIGS. 10 and 11, as described in more detail below. In addition, those constructions could be utilized for the second gripper 22. In a further preferred embodiment, however, the second gripper 22 is constructed in a manner shown in FIGS. 12 and 13. A preferred embodiment of the picker mechanism itself is shown in FIGS. 14 and 15, and is described in more detail below.

Referring now to FIG. 3, the data storage library 2 may be enlarged to form a data storage library 32 by extending the library 2 along the second or "y" axis. The data storage library 2 is extended by repetition of the first axis storage cell magazines 4 and 6 to form columns 34 and 36 extending parallel to the second directional axis. The picker mechanism 10 is mounted to a transport device of conventional design (not shown) so as to be transversely positionable along the second directional axis to access each storage cell magazine of the storage cell magazine columns 34 and 36.

Referring now to FIG. 4, the data storage library 2 may be enlarged to form a data storage library 42 by extending the library 2 along the first or "x" axis. The data storage library 2 is extended by repetition of the picker mechanism 10, the second axis storage cell magazine 8, and the first axis storage cell magazine 6 along the first directional axis such that adjacent sets of picker mechanisms 44 and first and second axis storage cell magazines 46 and 48 are created with the first axis storage cell magazines 46 being shared in adjacent sets.

Referring now to FIG. 5, the data storage library 2 may be enlarged to form a data storage library 52 extended along the first and second directional axes by combining the data storage libraries 32 and 42 of FIGS. 3 and 4.

Referring now to FIG. 6, the data storage library 2 may be enlarged to form a data storage library 62 extended in the direction of the first and second directional axes. The data storage library 2 is extended in the direction of the second directional axis by repetition of the first axis storage cell magazines 4 and 6 to form columns 64 and 66 extending parallel to the second directional axis. The picker mechanism 10 is mounted to a transport device of conventional design (not shown) so as to be transversely positionable along the second directional axis to access each storage cell magazine of the storage cell magazine column 64 and 66. The data storage library is extended in the direction of the first directional axis by repetition of the picker mechanism 10, the second axis storage cell magazine 8 and the first axis storage cell magazine column 66 along the first directional axis such that adjacent sets of picker mechanism 68, second axis storage cell magazines 70 and storage cell magazine columns 71 are created with the storage cell magazine columns 70 being shared in adjacent sets.

Referring now to FIG. 7, the data storage library 2 may be enlarged to form a data storage library 72. The data storage library 2 is extended by repetition of the first axis storage cell magazines 4 and 6 to form first and second rotatable magazine carousels 74 and 76 having plural storage cell magazines therein. Additionally, the data storage library 2 can be extended by repetition of the picker mechanism 10, the second axis storage cell magazine 8 and the first axis magazine carousels 74 and 76. That extension forms a system of four magazine carousels 74, 76, 78 and 80 arranged to form a square in which the second axis storage cell magazine 8 and the picker mechanism 10 are positioned between adjacent magazine carousels 74/76, and wherein a picker mechanism 82 and second axis storage cell magazine 84 are positioned between adjacent pairs of magazine carousel 76/80, 78/80 and 74/78. The second axis storage cell magazines 8 and 84 may contain one or more peripheral storage devices in communication with one or more host processing devices. The magazine carousels 74, 76, 78 and 80 are rotatable to permit access to each of the storage cell magazines therein by the picker mechanism 10 and 82.

Figure 8:
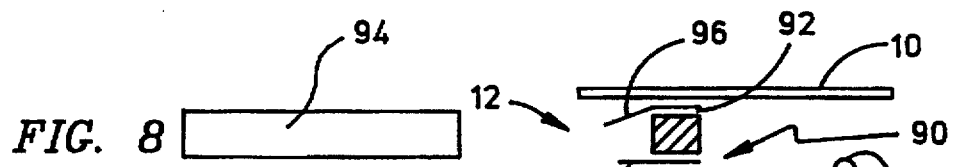
FIG. 8 is a side view of a gripper for use in the picker mechanism of FIG. 2.

Referring now to FIG. 8, the cartridge picker mechanism 10 of FIG. 2 may be constructed so that the gripper 20 (or the gripper 22) is a permanent magnet gripper 90. The permanent magnet gripper 90 includes a permanent magnet 92 adapted for magnetically attracting a metallic strip or the like, which can be positioned on a side portion of a storage media cartridge, such as the cartridge 94. The gripper 90 further includes a positionable separator formed from a resilient bendable arm 96 mounted on the magnet 92. The separator 96 is bendably positionable for selectively receiving the storage media cartridge 94 and repelling it to prevent magnetic attraction between the gripper 90 and the cartridge. Nominally, the separator 96 is located in the position shown in FIGS. 9A and 9B. A support lip 98 is further mounted to the magnet 92 to vertically support the cartridge while it is engaged with the gripper.

Figure 9A:
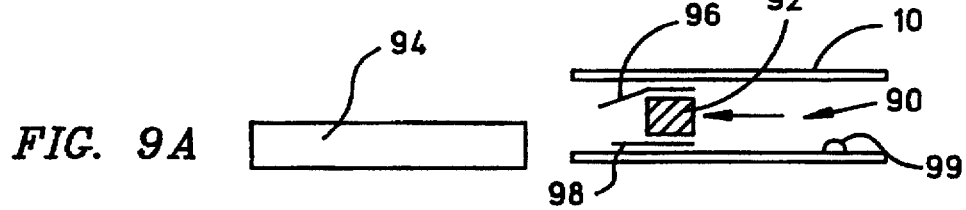
FIGS. 9A, 9B, 9C, 9D, 9E, 9F and 9G illustrate the operation of the gripper of FIG. 8.
Figure 9B:
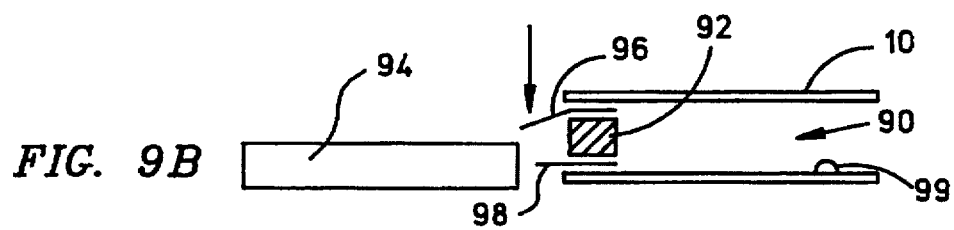
Figure 9C:
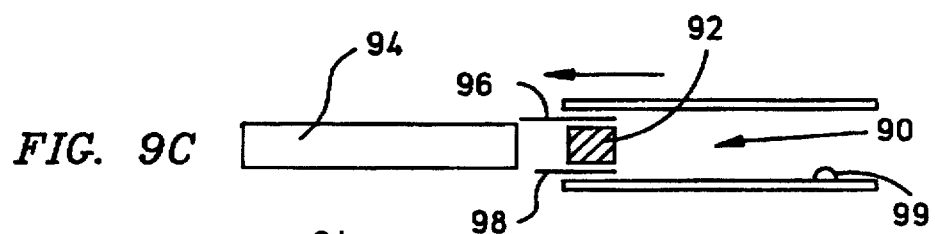
Figure 9D:
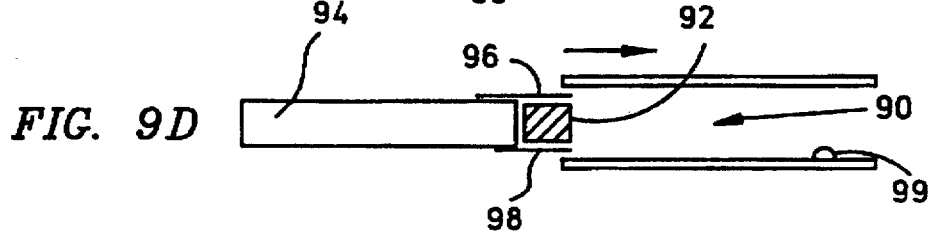
Figure 9E:
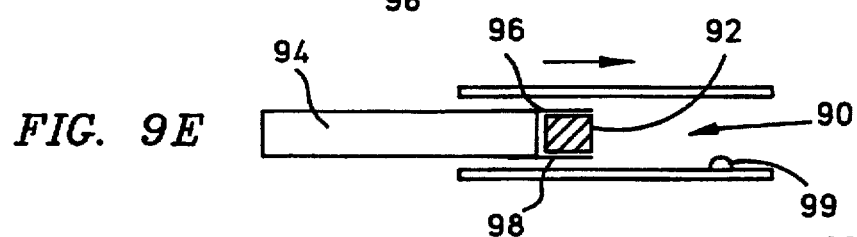
Figure 9F:
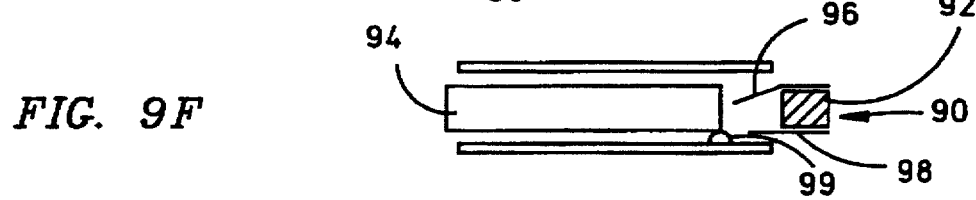
Figure 9G:
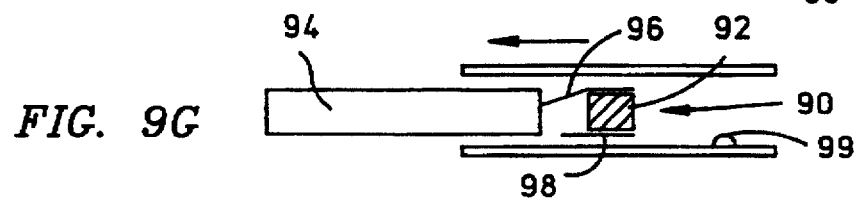

Referring now to FIGS. 9A–9G, the gripper 90 is slideably mounted in the picker mechanism 10 and positionable between a cartridge engagement position (shown by FIG. 9D) and a retracted position (shown by FIG. 9F). The picker mechanism 10 further includes a cartridge stop member 99 for engaging the cartridge 94 as the gripper 90 moves from its engagement position to its retracted position. The gripper 90 is positionable to retrieve the cartridge 94 from a storage cell location in one of the storage cell magazines 4 and 6 by first extending the gripper toward its engagement position with the picker mechanism 10 elevated so that the separator 96 is positioned above the cartridge 94, as shown in FIGS. 9A and 9B. To engage the cartridge 94, the picker mechanism 10 is translated vertically downwardly and the gripper is further extended until the permanent magnet 92 engages the cartridge 94 in the full gripper engagement position, as shown in FIGS. 9C and 9D. During this motion, the separator 96 deflects upwardly from its nominal position as it contacts the top of the cartridge 94. The gripper 90 is then returned to its retracted position, pulling the cartridge along with it. The gripper 90 disengages from the cartridge 94 as the cartridge contacts the cartridge stop member 99, and the separator 96 returns to its nominal undetected position, as shown in FIGS. 9E and 9F. In order to return the cartridge 94 to a storage location, the gripper 90 is moved to its engagement position with the cartridge separator 96 located at its nominal position to repel the cartridge away from the gripper, as shown in FIG. 9G.

Referring now to FIG. 10, the cartridge picker mechanism 10 of FIG. 2 may be constructed so that the gripper 20 (or the gripper 22) is a double lip gripper 100. The double lip gripper 100 includes a base 102 having a side portion thereof configured for engagement with a side portion of a storage media cartridge, such as the cartridge 104. A positionable separator, formed from a pivotable arm 106, is mounted to the base 102. The separator 106 is positionable for selectively receiving the storage media cartridge 104 and repelling it to prevent engagement of the gripper 100 and the cartridge. Nominally, the arm 106 is resiliently biased to the position shown in FIGS. 11A and 11B. A friction lip 108 is further mounted to the base 102 and configured to engage and grip the cartridge 104 for transport. The friction lip is pivotally mounted to the base 102 and resiliently biased to the nominal position shown in FIGS. 11A and 11B. In a preferred construction, the friction lip may include a hook 110 for engaging a lip or ridge (not shown) that is conventionally formed adjacent the sides of storage media cartridges. In other constructions, the friction lip could be made from a high friction material that engages the cartridge 104 with sufficient force to pull it from a storage cell.

Referring now to FIGS. 11A–11H, the gripper is slideably mounted in the picker mechanism 10 and positionable between a cartridge engagement position (shown by FIG. 11D) and a retracted position (shown by FIG. 11G). The picker mechanism 10 further includes a cartridge stop member 112 for engaging the pivotable friction lip 108 and the cartridge 104 as the gripper moves from its engagement position to its retracted position. The gripper 100 is positionable to retrieve the cartridge from a storage cell location by first extending the gripper toward its engagement position with the picker mechanism elevated so that the separator 106 is positioned above the cartridge 104, as shown in FIGS. 11A and 11B. To engage the cartridge 104, the picker mechanism 10 is translated vertically downwardly and the gripper is further extended until the friction lip 108 fully engages the cartridge 104, as shown in FIGS. 11C and 11D. During this motion, the separator 106 pivots upwardly from its nominal position as it contacts the top of the cartridge 104. The gripper 100 is then returned to its retracted position and is disengaged from the cartridge 104 as the separator 106 and the cartridge contact the cartridge stop member 112, as shown in FIGS. 11F and 11G. Cartridge disengagement occurs as a result of two actions. First, the stop member 112 pivots the friction lip 108 from its nominal position so that the hook 110 (or a high friction surface of the lip) releases the cartridge 104, as shown in FIG. 11G. The cartridge 104 also comes into contact with the stop member 112, which prevents further cartridge retraction. As the gripper 102 continues its retraction, the separator 106 disengages from the cartridge 104 and pivots to its nominal position. In order to return the cartridge 104 to a storage location, the gripper 100 is moved to its engagement position with the cartridge separator 106 located at its nominal position to repel the cartridge 104 away from the gripper, as shown in FIG. 11H.

Referring now to FIGS. 12 and 13, the cartridge picker mechanism 10 of FIG. 2 may be constructed so that the gripper 22 for accessing storage media cartridges in the storage cell magazines 8 is a releasable action gripper 120.

The gripper 120 is mounted for slidable movement between the first and second ends 17 and 18 of the picker mechanism 10. The gripper includes a pair gripper arms 122 and 124 for releasably engaging a pair of notches 126 and 128 formed in the sides of a storage media cartridge 130, adjacent an end portion thereof that is opposite the cartridge media access end portion. The gripper 120 further includes a main carrier 132 to which the gripper arms 122 and 124 are pivotally mounted, and a gripper arm disengagement system for disengaging the gripper arms 122 and 124 when the gripper 120 is retracted to the first cartridge chamber end 117.

Figure 12A:
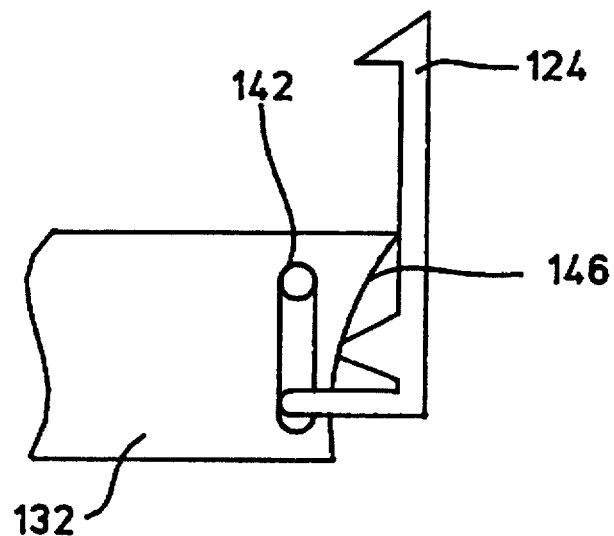
FIG. 12a is an enlarged detail view of the gripper arm and the main carrier of FIG. 12.

The disengagement system includes a cartridge stop member 134 slideably mounted to the main carrier 132. The cartridge stop member 134 has a first stop element 136 for engaging the storage media cartridge 130 and a second stop element 138 for engaging the first cartridge chamber end 17. The stop member 134 stops the retraction of the storage media cartridge 130 in the cartridge chamber while the main carrier 132 is positionable to continue its retraction toward the first cartridge chamber end 117. The disengagement system further includes a cam system for pivotally disengaging the gripper arms 122 and 124 from the storage media cartridge in response to the main carrier 132 being slideably positioned relative to the cartridge stop member 134. The cam system includes the main carrier 132 having a pair of slots 140 and 142 within which the gripper arms 122 and 124 are pivotally mounted. The slots 140 and 142 allow the main carrier 132 to retract from the storage media cartridge 130 while the gripper arms 122 and 124 remain initially engaged with the cartridge as shown in FIGS. 12 and 12a. Thereafter, however, a pair of outwardly flaring side surface portions 144 and 146 of the main carrier 132 urge the gripper arms 122 and 124 outwardly as the main carrier retracts from the storage media cartridge as shown in FIG. 13a. As the main carrier 132 retracts from the cartridge 130, a resiliently biased lock pin 148 inserts itself between the main carrier 132 and the stop element 136 with the arms 122 and 124 positioned as shown in FIG. 13. The lock pin 148 retains the main carrier 132 in its retracted position without power utilization until reengagement with the cartridge 130 is required. At that time, the lock pin 148 is removed from the gap.

Referring now to FIGS. 14 and 15, a picker mechanism 150 illustrates a preferred construction of the picker mechanism 10 of FIG. 2. The picker mechanism is shown in FIG. 14 to be adjacent a storage cell magazine 152, which corresponds to one of the storage cell magazines 4 and 6 of FIG. 2. Other storage cell magazines could also be positioned adjacent the picker mechanism 150 in accordance with FIG. 2, but are not shown in FIG. 14 for clarity. The picker mechanism 150 includes a housing 154 having an interior chamber 156 for holding a storage media cartridge 158. The housing 154 is supported on a vertical drive mechanism, such as the drive mechanism E of FIG. 1, having a support hub 160 and a vertical drive element 161. A gripper drive system is mounted on the housing 154 for controllably positioning a pair of grippers. The gripper drive system includes a gear mechanism 162 which used to selectively engage and position the grippers as will now be described.

FIG. 14 illustrates the components of the gripper drive system 162 used for positioning a gripper mechanism 164. The gripper mechanism 164 corresponds to the gripper 22 of FIG. 2 and is used to transport storage media cartridges to the storage cell magazines 8. The gripper mechanism 164 includes internal gripper components such as the releasable action gripper of FIGS. 12 and 13. An internally threaded gripper drive element 166 extends from the interior 156 of the picker housing 154 where it is engaged with an externally threaded drive shaft member 168. The drive shaft member 168 is supported for rotation on the housing 154 in a journal bearing assembly 170 located at one end of the housing and in the internally threaded portion of the drive element 166 at the opposite end of the housing. The drive shaft member 168 is further connected to a ring gear 172 via an intermediate pinion gear 174. Both the ring gear 172 and the pinion gear 174 can be mounted, directly or indirectly, on the hub 160, although other mounting schemes could also be used. The pinion gear 174 engages a set of inner gear teeth 176 (shown more clearly in FIG. 15) of the ring gear 172. The pinion gear also engages a drive shaft gear (not shown) mounted on the drive shaft member 168 for transferring power from the ring gear to the drive shaft member. In order to control the rotation of the ring gear 172, it can be mounted on a support axle (not shown) which is independently mounted for rotation about the hub 160 and controllably driven by a power source (not shown) such as drive belt connected to a motor that powers the vertical drive mechanism. Other power systems could also be used.

As power is applied to the drive shaft member 168, its rotation causes the threadably mounted gripper drive element 166 to translate between the end portions of the housing 154. A slot in the housing 154 provides a path for the gripper drive element 166 as it is driven by the drive shaft member 168. It will be seen from FIG. 14 that the gripper drive element 166 is positionable from a gripper retraction position adjacent the ring and pinion gears 172 and 174 to an extended position at the opposite end of the housing 154. In that way, the storage media cartridge 158 can be transported between the picker mechanism 150 and the storage cell magazine 8. It will also be observed from FIG. 14 that the picker mechanism 150 can be inverted or "flipped" using the gripper drive mechanism 162. Picker mechanism inversion is implemented by translating the gripper drive element 166 to its fully retracted position. A stop element or detent (not shown) is provided at that position to prevent further retraction of the drive element. To invert the picker mechanism 150, the gripper drive mechanism 162 is activated to apply continued retraction power. Because of the stop element, however, the gripper drive element 166 does not retract and instead transfers power to the housing 154, causing it to rotate.

Referring now to FIG. 15, the picker mechanism 150 is shown on the side opposite that shown in FIG. 14. FIG. 15 illustrates the components 180 of the gripper drive system 162 used for positioning a gripper mechanism corresponding to the gripper 20 of FIG. 2, which is used to transport storage media cartridges to the storage cell magazines 4 and 6. The gripper mechanism includes internal gripper components such as the permanent magnet gripper of FIGS. 8 and 9A–9G, or the double lip gripper of FIGS. 10 and 11A–11H. An internally threaded gripper drive element 182 extends from the interior 156 of the picker mechanism 150 where it is engaged with an externally threaded drive shaft member 184. The drive shaft member 184 is supported for rotation on the housing 154 in a journal bearing assembly 186 located at one side of the housing and in the internally threaded portion of the drive element 182 at the opposite side of the housing. The drive shaft member 186 is further connected to a second drive shaft member 188. The drive shaft member 188 is supported for rotation on the housing 154 in a pair of journal bearing assemblies 190 and 192. The drive shaft members 184 and 188 are interconnected by a bevel gear arrangement 194. The drive shaft member 188 is further connected to a large pinion gear 196 via an intermediate pinion gear 198. Both of the pinion gears 196 and 198 can be mounted, directly or indirectly, on the hub 160, although other mounting schemes could also be used. The pinion gear 198 engages a set of outer gear teeth 200 of the pinion gear 196. The pinion gear 198 is mounted at the end of the drive shaft member 188 and transfers power from the pinion gear 196 to the drive shaft member. In order to control the rotation of the pinion gear 196, it can be mounted on a support axle (not shown) which is independently mounted for rotation about the hub 160 and controllably driven by a power source (not shown) such as drive belt connected to a motor that powers the vertical drive mechanism. Other power systems could also be used.

As power is applied to the drive shaft members 188 and 184, their rotation causes the threadably mounted gripper drive element 182 to translate between the side portions of the busing 154. A slot in the busing 154 provides a path for the gripper drive element 182 as it is driven by the drive shaft members. It will be seen from FIG. 15 that the gripper drive element 182 is positionable from a gripper retraction position adjacent one side of the housing 154 to an extended position at the opposite side of the housing 154. In that way, a storage media cartridge, such as the cartridge 158 in FIG. 14, can be transported between the picker mechanism 150 and the storage cell magazines 4 and 6, depending on whether the picker mechanism 150 is upright or inverted.

Accordingly, an extendable data storage library utilizing a double gripper picker mechanism has been described. While various embodiments have been disclosed, it should be apparent that many variations and alternative embodiments would be apparent to those skilled in the art in view of the teachings herein. It is understood, therefore, that the invention is not to be in any way limited except in accordance with the spirit of the appended claims and their equivalents.

We claim:

1. An automated data storage library comprising:
    at least first, second and third columns of storage cells for holding storage media cartridges therein, at least one of said column of storage cells including a cell containing a peripheral storage device;
    the first and second columns of storage cells being bisected by a first directional axis and the third column of storage cells being spaced from the first directional axis and being bisected by a second directional axis, the first and second directional axes being perpendicular with respect to one another;
    a cartridge picker mechanism positioned for accessing the storage cells of said columns and transporting storage media cartridges therebetween;
    said cartridge picker mechanism including a single cartridge casing which has a top and a bottom which are bounded laterally by right, left, front and back sides, each of the right and left sides being bisected by the first directional axis and each of the front and back sides being bisected by the second directional axis;
    said cartridge casing having first and second open sides, the first open side being one of said right and left sides and the second open side being one of said front and back sides;
    said first open side facing one of said first and second columns of storage cells and the second open side facing said third column of storage cells;
    said cartridge picker mechanism including first and second grippers mounted in the cartridge casing and independently movable within the cartridge casing toward said first and second open sides, respectively, in order to retrieve storage cartridges located in columns of storage cells adjacent said first and second open sides respectively; and
    said cartridge picker mechanism being mounted for rotation about said second directional axis for selectively accessing said first and second columns of storage cells through said first open side while the third column of storage cells remains accessible at all times to the cartridge picker mechanism through said second open side.

2. The automated data storage library of claim 1 wherein said library is extended by repetition of said picker mechanism four times, repetition of said first and second columns of storage cells to form a carousel and repetition of the carousel four times with the carousels arranged in a square, a respective one of the four picker mechanisms positioned between each adjacent carousel and four of the third column of storage cells with each third column of storage cells centrally positioned between said carousels, each of the third column of storage cells containing a media drive for receiving said cartridge.

3. The automated data storage library of claim 1 wherein at least one of the first and second grippers of the cartridge picker mechanism is a double lip gripper which includes a resilient friction lip and a resilient separator lip which are spaced with respect to each other, the separator lip having a flexed position away from the friction lip for receiving the cartridge between the lips and a relaxed position which blocks receipt of said cartridge between the lips; and
    the friction and separator lips engaging the cartridge when the cartridge is received between the lips for transporting the cartridge into the casing and the separator lip engaging a portion of the cartridge when the cartridge is not received between the lips for pushing the cartridge out of the casing.

4. The automated data storage library of claim 3 wherein each double lip gripper is positionable in a respective cartridge casing between a cartridge engagement position and a retracted position, and wherein said respective cartridge picker mechanism includes a cartridge stop member in the casing for engaging said cartridge as said picker mechanism moves from its engagement position to said retracted position.

5. The automated data storage library of claim 4 wherein said at least one of the first and second grippers is positionable to retrieve said cartridge from a storage cell location by (1) extending said double lip gripper toward said engagement position with said separator lip vertically spaced from said cartridge, (2) vertically translating said picker mechanism until the separator lip enrages the cartridge and further extending the respective double lip gripper until said friction lip engages said cartridge, and (3) retracting said double lip gripper to said retracted position while disengaging said double lip gripper from said cartridge as said friction lip and said cartridge engage said cartridge stop member.

6. A data storage library comprising:
    a first picker assembly including:
        a picker casing having a top and a bottom which are bounded laterally by right, left, front and back sides, each of the right and left sides being bisected by a horizontally oriented x axis and each of the front and back sides being bisected by a horizontally oriented y axis, the x and y axes being perpendicular with respect to one another so as to define an x-y horizontal plane which is perpendicular to a vertically oriented z axis;

one of the right and left sides of the picker casing providing the casing with a first opening for receiving said cartridge within said picker casing;

one of the front and back sides of the picker casing providing the casing with a second opening;

a first gripper device for gripping a cartridge, the gripper device being mounted in the picker casing for reciprocable movement along the x axis;

a first translation means for reciprocably moving the first gripper device along the x axis so that said cartridge can be received or ejected from the picker casing through said first opening;

a second gripper device in the picker casing and a second translation means in the casing for reciprocating the second gripper device along said y axis;

the first gripper device transporting cartridges through the first opening of the picker casing and the second gripper device transporting cartridges through the second opening of the picker casing;

first flipping means for flipping the picker casing about the y axis; and means for reciprocably moving the picker casing along said z axis;

first and second rotatable carousels located adjacent the right and left sides respectively;

each carousel having a plurality of vertically oriented columns of cartridge receptacles with openings which selectively face one of said right and left sides upon rotation of the carousel;

an additional column of cartridge receptacles adjacent said second opening and at least one of the receptacles in the individual column of receptacles containing a media drive for receiving said cartridge, whereby cartridges will be transferred between receptacles in a column of cartridge receptacles, between receptacles in columns of cartridge receptacles, between cartridge receptacles in said carousels and between cartridge receptacles in said carousels and cartridge receptacles in said additional column of receptacles.

7. A data storage library as claimed in claim 6 comprising:

third and fourth rotatable carousels which replicate the first and second rotatable carousel, the first, second, third and fourth carousels being arranged in a square;

second, third and fourth picker assemblies which replicate the first picker assembly;

each picker assembly being located between a pair of the rotatable carousels so that cartridges can be transported between any cartridge receptacle in any carousel to any cartridge receptacle in any other carousel;

second, third and fourth individual columns of receptacles replicating the first individual column of receptacles and adjacent selected openings of the cartridge casings of the second, third and fourth picker assemblies respectively;

said first flipping means for individually flipping each of said first and second picker casings about said y axis for selectively aligning the first opening in the first picker casing with cartridge receptacles in the first and second carousels and for selectively aligning the first opening in the second picker casing with the third and fourth carousels; and second flipping means for individually flipping said third and fourth picker casings about said x axis for selectively aligning the second opening in the third picker casing with cartridge receptacles in the first and third carousels and for selectively aligning the second opening in the fourth picker casing with cartridge receptacles in the second and fourth carousels.

8. The data storage library of claim 7 wherein at least one of the first and second grippers of each cartridge picker assembly is a double lip gripper which includes a resilient friction lip and a resilient separator lip which are spaced with respect to each other, the separator lip having a flexed position away from the friction lip for receiving the cartridge between the lips and a relaxed position which blocks receipt of said cartridge between the lips; and the friction and separator lips engaging the cartridge when the cartridge is received between the lips for transporting the cartridge into the casing and the separator lip engaging a portion of the cartridge when the cartridge is not received between the lips for pushing the cartridge out of the casing.

9. The data storage library of claim 8 wherein each double lip gripper is positionable in a respective cartridge casing between a cartridge engagement position and a retracted position, and wherein said respective cartridge picker mechanism includes a cartridge stop member in the casing for engaging said cartridge as said picker mechanism moves from its engagement position to said retracted position.

10. The data storage library of claim 9 wherein said at least one of the first and second grippers is positionable to retrieve said cartridge from a storage cell location by (1) extending said double lip gripper toward said engagement position with said separator lip vertically spaced from said cartridge, (2) vertically translating said picker mechanism until the separator lip engages the cartridge and further extending the respective double lip gripper until said friction lip engages said cartridge, and (3) retracting said double lip gripper to said retracted position while disengaging said double lip gripper from said cartridge as said friction lip and said cartridge engage said cartridge stop member.

11. A data storage library as claimed in claim 6 wherein the first and second translation means include:

one of the top and bottom of each picker casing having a first slot which extends parallel to said horizontal plane and the other of the top and bottom of the picker casing having a second slot which extends parallel to said horizontal plane, the first and second slots being mutually perpendicular as projected in said horizontal plane;

first and second lead screws with respective first and second engaging nuts located in said first and second slots respectively with each screw being rotatably mounted to the picker casing so that upon rotation of the screw the respective nut can reciprocate in the respective slot; and the first and second nuts being connected to the first and second gripper devices for reciprocating the first and second gripper devices parallel to said x and y axes respectively.

12. The automated data storage library of claim 11 wherein at least one of the first and second grippers of each cartridge picker mechanism is a double lip gripper which has a positionable separator lip for selectively receiving and repelling a storage media cartridge to prevent engagement of said double lip gripper and said cartridge, and a friction lip configured to engage and grip said cartridge for transport.

13. A data storage library comprising:

first, second, third and fourth picker assemblies, each picker assembly including:

a picker casing having a top and a bottom which are bounded laterally by right, left, from and back sides, each of the right and left sides being bisected by a horizontally oriented x axis and each of the front and back sides being bisected by a horizontally oriented y axis, the x and y axes being perpendicular with respect to one another so as to define an x-y horizontal plane which is perpendicular to a vertically oriented z axis;

first and second gripper devices for gripping cartridges, the gripper devices being mounted in the picker casing for reciprocable movement along the x and y axes respectively;

one of the right and left sides of the picker casing providing the casing with a first opening for receiving said cartridge within said picker casing and one of the front and back sides providing the casing with a second opening for receiving said cartridge within the picker casing;

the first gripper device transporting cartridges through the first opening of the picker casing and the second gripper device transporting cartridges through the second opening of the picker casing; and first and second translation means for reciprocably moving the first and second gripper devices along the x and y axes respectively so that said cartridge can be received or ejected from the picker casing through said first and second openings;

each of the first and second translation means including:

one of the top and bottom of the respective picker casing having a first slot which extends parallel to said horizontal plane and the other of the top and bottom of the picker casing having a second slot which extends parallel to said horizontal plane, the first and second slots being mutually perpendicular as projected in said horizontal plane;

first and second lead screws with respective first and second engaging nuts located in said first and second slots respectively with each screw being rotatably mounted to the picker casing so that upon rotation of the screw the respective nut can reciprocate in the respective slot; and the first and second nuts being connected to the first and second gripper devices for reciprocating the first and second gripper devices parallel to said x and y axes respectively;

means for reciprocably moving the picker casing along said z axis;

first, second, third and fourth rotatable carousels arranged in a square;

each carousel having a plurality of vertically oriented columns of cartridge receptacles with openings which face one of the open sides of a respective picker casing upon rotation of the carousel;

each picker assembly being located between a pair of the rotatable carousels so that cartridges can be transported between any cartridge receptacle in any carousel to any cartridge receptacle in any other carousel;

first flipping means for individually flipping each of said first and second picker casings about said y axis for selectively aligning the first opening in the first picker casing with cartridge receptacles in the first and second carousels and for selectively aligning the first opening in the second picker casing with the third and fourth carousels; and second flipping means for individually flipping said third and fourth picker casings about said x axis for selectively aligning the second opening in the third picker casing with cartridge receptacles in the first and third carousels and for selectively aligning the second opening in the fourth picker casing with cartridge receptacles in the second and fourth carousels;

first and second individual columns of receptacles adjacent second openings of the casings of the first and second picker assemblies respectively and third and fourth individual columns of receptacles adjacent first openings of the casings of the third and fourth picker assemblies respectively;

at least one of the receptacles in at least one individual column of receptacles containing a media drive for receiving said cartridge;

whereby cartridges can be transferred between receptacles in a column of cartridge receptacles, between receptacles in columns of cartridge receptacles and between cartridge receptacles in said carousels.

14. A data storage library as claimed in claim 13 wherein at least one of the first and second grippers of each cartridge picker mechanism is a double lip gripper which has a positionable separator lip for selectively receiving and repelling a storage media cartridge to prevent engagement of said double lip gripper and said cartridge, and a friction lip configured to engage and grip said cartridge for transport.

* * * * *